US012493252B2

(12) United States Patent
Kim et al.

(10) Patent No.: US 12,493,252 B2
(45) Date of Patent: Dec. 9, 2025

(54) STRUCTURE FOR ELECTRIC CONTACT PORTION OF TONER CARTRIDGE

(71) Applicant: Hewlett-Packard Development Company, L.P., Spring, TX (US)

(72) Inventors: Junhui Kim, Seongnam-Si (KR); Jinsam Park, Seongnam Si (KR); Sanghoon Lee, Seongnam Si (KR); Jongin Kim, Seongnam Si (KR)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 18/866,066

(22) PCT Filed: Dec. 5, 2022

(86) PCT No.: PCT/US2022/051780

§ 371 (c)(1),
(2) Date: Nov. 14, 2024

(87) PCT Pub. No.: WO2023/244263

PCT Pub. Date: Dec. 21, 2023

(65) Prior Publication Data

US 2025/0355382 A1 Nov. 20, 2025

(30) Foreign Application Priority Data

Jun. 15, 2022 (KR) ........................ 10-2022-0072738

(51) Int. Cl.

| | |
|---|---|
| ***G03G 15/00*** | (2006.01) |
| ***G03G 15/08*** | (2006.01) |
| ***G03G 21/16*** | (2006.01) |

(52) U.S. Cl.
CPC ..... *G03G 15/0863* (2013.01); *G03G 15/0867* (2013.01); *G03G 15/0886* (2013.01); *G03G 15/80* (2013.01); *G03G 21/1676* (2013.01)

(58) Field of Classification Search
CPC ........... G03G 15/0863; G03G 15/0867; G03G 15/0886; G03G 15/80; G03G 21/1676
USPC ........................................... 399/90, 111, 262
See application file for complete search history.

(56) References Cited

U.S. PATENT DOCUMENTS

| | | | |
|---|---|---|---|
| 6,185,390 B1 * | 2/2001 | Higeta .............. | G03G 21/1867 399/167 |
| 10,691,062 B1 | 6/2020 | Amann et al. | |
| 10,761,476 B1 | 9/2020 | Leemhuis et al. | |

(Continued)

FOREIGN PATENT DOCUMENTS

| | | |
|---|---|---|
| JP | 11-109832 A | 4/1999 |
| JP | 4985030 B2 | 7/2012 |
| JP | 2021056429 * | 4/2021 |

*Primary Examiner* — Hoan H Tran
(74) *Attorney, Agent, or Firm* — Foley & Lardner LLP

(57) ABSTRACT

A toner cartridge includes a body having a toner outlet therein, a coupler provided on the body, and an electric contact portion for electrical connection with a printing apparatus. Based on a force applied to the electric contact portion by an elastic sealing member between the printing apparatus and the toner outlet being referred to as a first force and a force applied to the electric contact portion by rotation of the coupler being referred to as a second force, a contact surface of the electric contact portion faces between a direction of the first force and a direction of the second force.

15 Claims, 9 Drawing Sheets

(56) References Cited

U.S. PATENT DOCUMENTS

| | | | | |
|---|---|---|---|---|
| 11,789,405 | B2 * | 10/2023 | Saeki ................. | G03G 21/1867 399/111 |
| 2008/0240774 | A1 | 10/2008 | Fukamachi et al. | |
| 2011/0129252 | A1 | 6/2011 | Oda et al. | |
| 2013/0343019 | A1 | 12/2013 | Amann et al. | |
| 2015/0098721 | A1 | 4/2015 | Buchanan et al. | |
| 2015/0139688 | A1 | 5/2015 | Leemhuis et al. | |
| 2018/0335752 | A1 | 11/2018 | Saeki et al. | |
| 2021/0063953 | A1 | 3/2021 | Payne et al. | |
| 2021/0116853 | A1 | 4/2021 | Kimura | |
| 2022/0107604 | A1 | 4/2022 | Komatsu et al. | |

* cited by examiner

STRUCTURE FOR ELECTRIC CONTACT PORTION OF TONER CARTRIDGE

CROSS-REFERENCE TO RELATED APPLICATIONS

This application is a US National Stage Entry under 35 U.S.C. § 371 of International Application No.: PCT/US2022/051780 filed Dec. 5, 2022, which claims priority to Korean Patent Application No.: 10-2022-0072738, filed Jun. 15, 2022, which are hereby incorporated by reference in their entireties.

BACKGROUND

In a printing apparatus using an electronic photographic method, toner may be supplied to an electrostatic latent image formed on a photoconductor to form a visible toner image on the photoconductor, the toner image may be transferred through an intermediate transfer medium or transferred directly to a printing medium, and the transferred toner image may be is fixed on the printing medium.

The toner may be accommodated in a toner cartridge that may be detachable from the printing apparatus. The toner cartridge may be replaced at the end of its life. Based on the toner accommodated inside the toner cartridge being consumed, the toner cartridge can be removed from the printing apparatus, and a new toner cartridge can be mounted on the printing apparatus. The toner cartridge may be electrically connected to the printing apparatus.

BRIEF DESCRIPTION OF THE DRAWINGS

Various examples will be described below by referring to the following figures.

DETAILED DESCRIPTION

Figure 1:
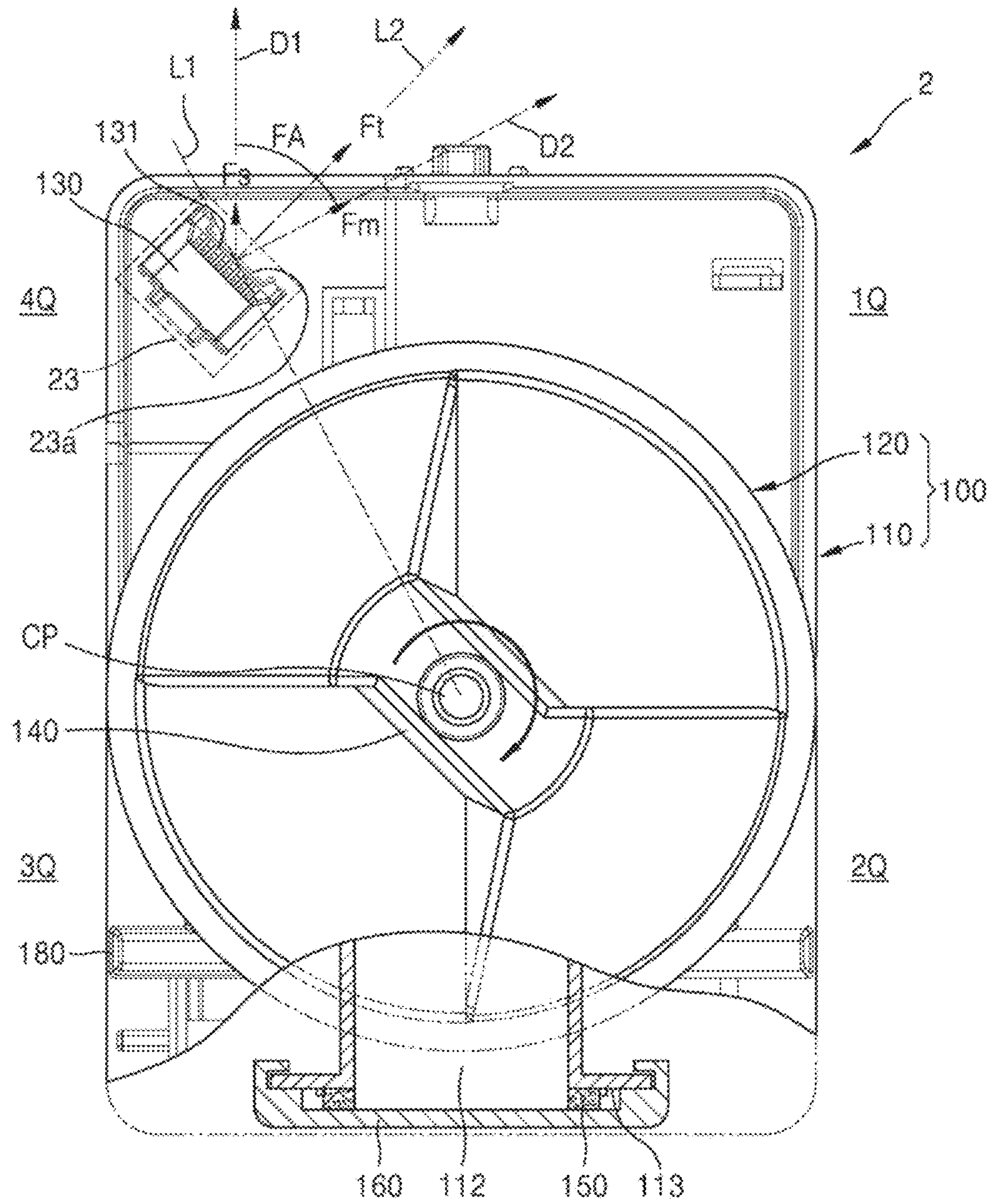
FIG. 1 is a front view of a toner cartridge according to an example.

Hereinafter, various examples will be described with reference to the drawings. Like reference numerals in the specification and the drawings denote like elements, and thus a redundant description may be omitted.

A printing apparatus that is to print an image on a printing medium by an electronic photographic method may include a developing unit to supply toner to an electrostatic latent image formed on a photoconductor to develop the electrostatic latent image in a visible toner image. The toner may be accommodated in a replaceable toner cartridge. The toner may be supplied to the developing unit from the toner cartridge. Based on the toner cartridge being mounted on the printing apparatus, the toner cartridge may be electrically connected to the printing apparatus. A toner outlet of the toner cartridge and a toner inlet of the printing apparatus may be connected to each other by interposing an elastic sealing member therebetween, and the toner cartridge may be driven by a rotational force from a driving coupler of the printing apparatus.

The position of the toner cartridge may be changed within the printing apparatus due to the rotation force transmitted from the printing apparatus to the toner cartridge and force applied to the toner cartridge by the elastic sealing member. In the printing apparatus, the position change of the toner cartridge may negatively affect a stable electrical connection between the toner cartridge and the printing apparatus. In an example, a structure to maintain a stable electrical connection between the toner cartridge and the printing apparatus is described.

In an example, the toner cartridge includes a body having a toner outlet, a coupler provided on the body, and an electric contact portion for an electrical connection with the printing apparatus. A toner cartridge according to an example is to provide an electric contact portion arrangement structure that is capable of a stable electrical connection in consideration of the rotation force transmitted from the printing apparatus to the toner cartridge and force applied to the toner cartridge by the elastic sealing member. In an example, based on force acting on the electric contact portion by the elastic sealing member between the printing apparatus and the toner outlet being referred to as a first force and force acting on the electric contact portion by the rotation of the coupler being referred to as a second force, a contact surface of the electric contact portions may be in a direction between the direction of the first force and the direction of the second force. In an example, the direction in which the toner cartridge may be moved due to the first and second force may be a direction in which the contact surface of the electric contact portions has access to a second contact surface of a second electric contact portion provided on the printing apparatus, a stable electrical connection between the electric contact portion and the second electric contact portion may be maintained. In an example, the toner outlet may be provided at a lower part of a body, and the electric contact portion may be located at a third quadrant and a fourth quadrant among quadrants in which the center of a coupler is set to be the origin. In an example, an angle formed between a first force and a second force, that is, an angle of the second force with respect to the first force may be within ±90 degrees. In an example, a contact surface of the electric contact portion may face a direction of a resultant force of the first and second force.

In an example, a recess that is to accommodate the electric contact portion as a whole may be provided in the body. An opening to provide an external access to the electric contact portion in the recess (i.e., from the outside) may be provided in the recess. According to such a configuration, the risk of damage to the electric contact portion due to an external shock during the handling of the toner cartridge may be reduced. In an example, the toner cartridge may include a handle for handling (e.g., moving, mounting, dismounting, etc.) the toner cartridge. The electric contact portion may be located closer to the handle than the toner outlet. According to such a configuration, while the toner cartridge is mounted/removed on/from the printing apparatus, the electric contact portion may be stably and electrically connected to a second electric contact portion. In an example, the toner cartridge may include a positioning portion for establishing (e.g., guiding, positioning, etc.) the position of the toner cartridge in the printing apparatus. Based on a mounting direction in which the toner cartridge is mounted on the printing apparatus, the positioning portion may be located in front of the electric contact portion. According to such a configuration, based on the toner cartridge being mounted on the printing apparatus, the electric contact portion may be in contact with the second electric contact portion after the positioning portion is aligned with a second positioning portion provided in the printing apparatus. Thus, based on the toner cartridge being mounted on the printing apparatus, a collision with the electric contact portion and the second electric contact portion or other structure inside the printing apparatus and the risk of damage to the electric contact portion caused thereby may be reduced.

In an example, the toner cartridge may include a fixing portion and a toner storing portion rotatably connected to the fixing portion. The toner may be accommodated in the toner storing portion. The toner outlet may be provided in the fixing portion. The toner storing portion may include the coupler. Based on the toner cartridge being mounted on the printing apparatus, the coupler may be connected to a driving coupler of the printing apparatus. While being rotated, the toner storing portion may transport the toner accommodated therein to the fixing portion. The above-described electric contact portion, recess, handle, positioning portion may be provided in the fixing portion.

An example of the printing apparatus may include a developing device to supply toner to an electrostatic latent image formed on the photoconductor to develop an electrostatic latent image, and the above-described toner cartridge, in which toner to be supplied to the developing device may be accommodated and which is removable from a main body. Hereinafter, examples of the toner cartridge and the printing apparatus will be described with reference to the drawings. The same reference numerals in the drawings refer to components with the same function, and the size of each component may be exaggerated for the clarity and convenience of the description.

Figure 2:
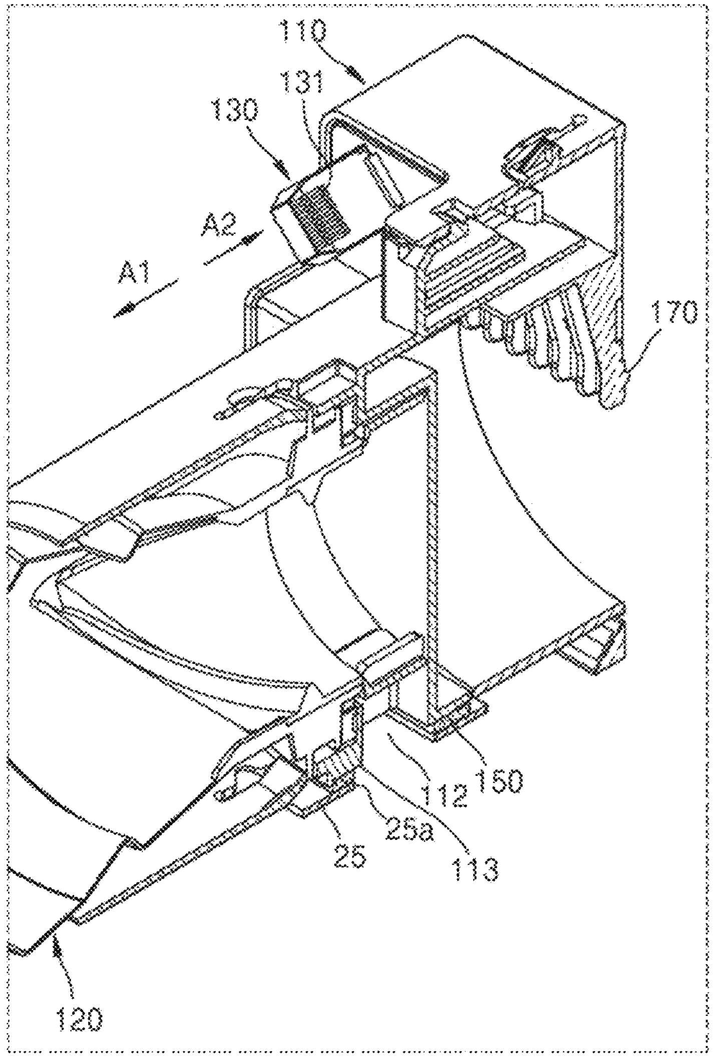
FIG. 2 is a schematic perspective view of a toner cartridge according to an example.
Figure 3:
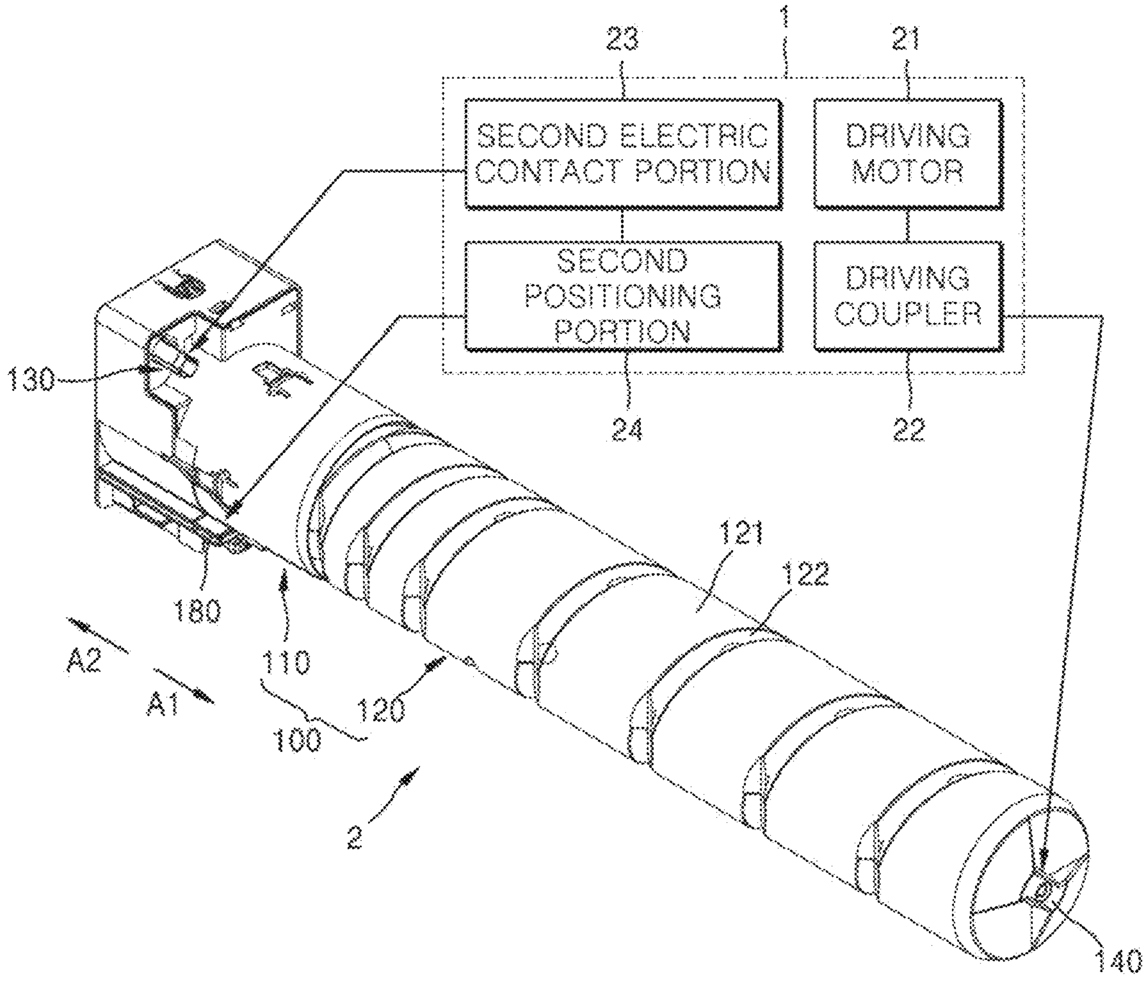
FIG. 3 is a partial cross-sectional view of a toner cartridge according to an example.

FIG. 1 is a front view of a toner cartridge 2 according to an example. FIG. 2 is a partial cross-sectional view of the toner cartridge 2 according to an example. FIG. 3 is a perspective view of the toner cartridge 2 according to an example. Referring to FIGS. 1 through 3, the toner cartridge 2 may include a body 100, a coupler 140, and an electric contact portion 130. The toner may be accommodated in the body 100, and a toner outlet 112, through which the toner may be discharged, may be provided in the body 100. In order to illustrate the toner outlet 112, in FIG. 1, part of the body 100 is illustrated in a cross-sectional view. The coupler 140 may be provided in the body 100, and, based on the toner cartridge 2 being mounted on a printing apparatus 1, a rotation force may be applied to the toner cartridge 2 from the printing apparatus 1.

In an example, the body 100 may include a fixing portion 110 and a toner storing portion 120. The toner outlet 112 may be provided in the fixing portion 110. The fixing portion 110 may have a cylindrical shape with one side open, for example. For example, the fixing portion 110 may entirely have a cylindrical shape having an open end and a closed end. The open end and the closed end may be at opposite ends of the fixing portion 110, for example, in a lengthwise direction. The lengthwise direction may be mounting/removal directions A1 and A2 in the printing apparatus 1 of the toner cartridge 2. In an example, the open end may be an end of the fixing portion 110 in a mounting direction A1, and the closed end may be an end of the fixing portion 110 in the removal direction A2. At the closed end of the fixing portion 110, a structure that the user may grip during handling of the toner cartridge 2, for example, a handle 170, may be provided. The toner cartridge 2 may include a shutter 160 for opening/closing the toner outlet 112. For example, the shutter 160 may be located in a position where the toner outlet 112 is closed, and, based on the toner cartridge 2 being mounted on the printing apparatus 1, the shutter 160 may be moved in a position where the toner outlet 112 is open. In another example, based on the toner cartridge 2 being mounted on the printing apparatus 1, the shutter 160 may be moved in a position where the toner outlet 112 is open by using a driving unit (not shown) provided in the printing apparatus 1.

Toner may be accommodated in the toner storing portion 120. The toner storing portion 120 may be rotatably connected to the fixing portion 110. For example, the toner storing portion 120 may have a cylindrical shape with one side open, for example, an open end and a closed end. The open end and the closed end may be at opposite ends of the toner storing portion 120, for example, in a lengthwise direction. The lengthwise direction may be mounting/removal directions A1 and A2 in the printing apparatus 1 of the toner cartridge 2. In an example, the open end may be an end of the toner storing portion 120 in the removal direction, and the closed end may be an end of the toner storing portion 120 in the mounting direction A1. The toner storing portion 120 may be rotatably connected to the fixing portion 110. The toner storing portion 120 may be connected to the fixing portion 110 so that the open end of the toner storing portion 120 may face the open end of the fixing portion 110. The toner storing portion 120 may be rotated with respect to the fixing portion 110 and may transport toner accommodated therein to the fixing portion 110. A rotation axis of the toner storing portion 120 may be an axis in the lengthwise direction of the toner storing portion 120, i.e., an axis in the/mounting/removal directions of the toner cartridge 2 on/from the printing apparatus 1. A spiral structure 122 protruding inside the body 121 of the toner storing portion 120 may be provided. Based on the toner storing portion 120 being rotated, due to the spiral structure 122, toner accommodated in the toner storing portion 120 may be transported to the fixing portion 110.

The toner storing portion 120 may include the coupler 140. The coupler 140 may be provided at the closing end of the toner storing portion 120. Based on the toner cartridge 2 being mounted on the printing apparatus 1, the coupler 140 may be engaged with the driving coupler 22. For example, the coupler 140 and the driving coupler 22 may have a complementary shape in which the coupler 140 and the driving coupler 22 may be engaged with each other to transfer a rotation force. The driving motor 21 may be driven to rotate the driving coupler 22 so that the toner storing portion 120 may be rotated.

The toner outlet 112 may be provided at the body 100, for example, on a bottom surface 113 of the fixing portion 110. In the example illustrated in FIG. 2, a seating portion 25 including a toner inlet **25*a* may be provided in the printing apparatus 1. Based on the toner cartridge 2 being mounted on the printing apparatus 1, the bottom surface 113 of the fixing portion 110 may be mounted on the seating portion 25, and the toner outlet 112 may be aligned with the toner inlet 25*a*. In order to reduce or prevent leakage of toner while the toner is transferred from the toner outlet 112 to the toner inlet 25*a*, an elastic sealing member 150 may be provided. The elastic sealing member 150 may be provided on the bottom surface 113 of the fixing portion 110 to surround the toner outlet 112. In another example, the elastic sealing member 150 may be provided in the seating portion 25 to surround the toner inlet 25***a*. Based on the toner cartridge 2 being mounted on the printing apparatus 1, the elastic sealing member 150 may be elastically compressed between the bottom surface 113 of the fixing portion 110 and the seating portion 25. The leakage of toner may be reduced or prevented while the toner is transferred from the toner outlet 112 to the toner inlet 25*a*.

The toner cartridge 2 may include a communication portion. Based on the toner cartridge 2 being mounted on the printing apparatus 1, the communication portion may be electrically connected to the printing apparatus 1 and may communicate with the printing apparatus 1. The communication portion may include a circuit portion (not shown) to monitor or manage the state of the toner cartridge 2, and the electric contact portion 130 to connect with the printing apparatus 1. The circuit portion may include a customer replaceable unit monitor (CRUM) including a central processing unit (CPU) to perform authentication and/or encryption of data communication between the printing apparatus 1 and the circuit portion using an operating system (O/S), for example. The circuit portion may further include a memory. Various types of information about the toner cartridge 2 may be stored in the memory. For example, information about the manufacturer, information about the date of manufacture, unique information, such as a serial number, a model name, etc., various programs, electronic sign information and information about the usage state (e.g., the number of printed sheets until present, the remaining number of sheets to be printed, and the remaining amount of toner) may be stored in the memory. Also, information about the life and/or the setup menu of the toner cartridge 2 may be stored in the memory. In addition, the circuit portion may include a functional block to perform various functions for communication with the printing apparatus 1, authentication, encryption, etc. The circuit portion may be implemented in the form of a chip including a CPU, the form of a chip including a memory and a CPU, the form of a printed circuit board (PCB), on which a chip and circuit elements for performing various functions are mounted, and the like.

The electric contact portion 130 may have various shapes that may be electrically connected to the printing apparatus 1, such as a conductive pattern shape, a modular jack shape, an elastic terminal shape, etc. The electric contact portion 130 according to an example has a modular jack shape. The electric contact portion 130 may protrude from the fixing portion 110 in the mounting direction A1. A second electric contact portion 23, to which the electric contact portion 130 may be connected, may be provided in the printing apparatus 1. The second electric contact portion 23 may have a shape in which the modular jack shaped electric contact portion, that is, the electric contact portion 130, may be inserted. For example, the electric contact portion 130 may include a contact surface 131. A plurality of electric contacts may be provided in the contact surface 131. The second electric contact portion 23 may include a second contact surface 23*a*. A plurality of second electric contact points may be provided in the second contact surface 23*a*. Based on the electric contact portion 130 being connected to the second electric contact portion 23, the plurality of electric contact points may be electrically connected to the plurality of second electric contact points. For example, at least one of the plurality of electric contact points and the plurality of second electric contact points may be an elastic electric contact point that is elastically deformed.

The toner cartridge 2 may be designed in such a way that the body 100, for example, the fixing portion 110 may be maintained in a mounting position inside the printing apparatus 1. However, the toner cartridge 2 may move to some extent from the mounting position due to the dimensional tolerance and manufacturing error of the toner cartridge 2 or parts that constrain the position of the toner cartridge 2 inside the printing apparatus 1. As described above, based on the toner cartridge 2 being mounted on the printing apparatus 1, the elastic sealing member 150 may be compressed between a bottom surface 113 of the fixing portion 110 and a seating portion 25 of the printing apparatus 1. An elastic force of the elastic sealing member 150 may be applied to the toner cartridge 2. Due to rotation of the coupler 140 connected to the driving coupler 22, a rotation force may be applied to the toner cartridge 2. These two forces may cause deformation in a position of the toner cartridge 2 within the printing apparatus 1.

The toner cartridge 2 may have a tendency of moving in a direction of an elastic force of the elastic sealing member 150. Also, the toner cartridge 2 may have a tendency of rotating in a rotation direction of the coupler 140. In this case, the position change of the toner cartridge 2 due to the elastic force of the elastic sealing member 150 and the rotation force of the coupler 140 may cause the position change of the electric contact portion 130 with respect to the second electric contact portion 23. Considering this point, the electric contact portion 130 may be disposed so that a stable electrical connection with the second electric contact portion 23 may be maintained.

For example, referring to FIG. 1, a force applied to the electric contact portion 130 by the elastic sealing member 150 is referred to as a first force Fs, and force applied to the electric contact portion 130 by rotation of the coupler 140 is referred to as a second force Fm. Due to the first force Fs, the electric contact portion 130 may be moved in a direction of the first force Fs, i.e., in a first direction D1. The first direction D1 may be, for example, vertical. Due to the second force Fm, the electric contact portion 130 may be moved in a direction of the second force Fm, i.e., in a second direction D2. The second direction D2 is a direction perpendicular to a line L1 connecting a center CP of the coupler 140 to the center of a contact surface 131 of the electric contact portion 130. The electric contact portion 130 may be disposed in such a way that the contact surface 131 faces between a direction of the first force Fs, i.e., the first direction D1 and a direction of the second force Fm, i.e., the second direction D2. In other words, the electric contact portion 130 may be disposed so that the normal L2 perpendicular to the contact surface 131 faces between the first direction D1 and the second direction D2. According to such a configuration, both of the first force Fs and the second force Fm act in a direction in which the electric contact portion 130 has access to the second electric contact portion 23. That is, based on the electric contact portion 130 being moved in the first direction D1 and the second direction D2, the electric contact portion 130 has access to the second electric contact portion 23. Thus, stable electric connection between the electric contact portion 130 and the second electric contact portion 23 may be maintained.

Figure 4:
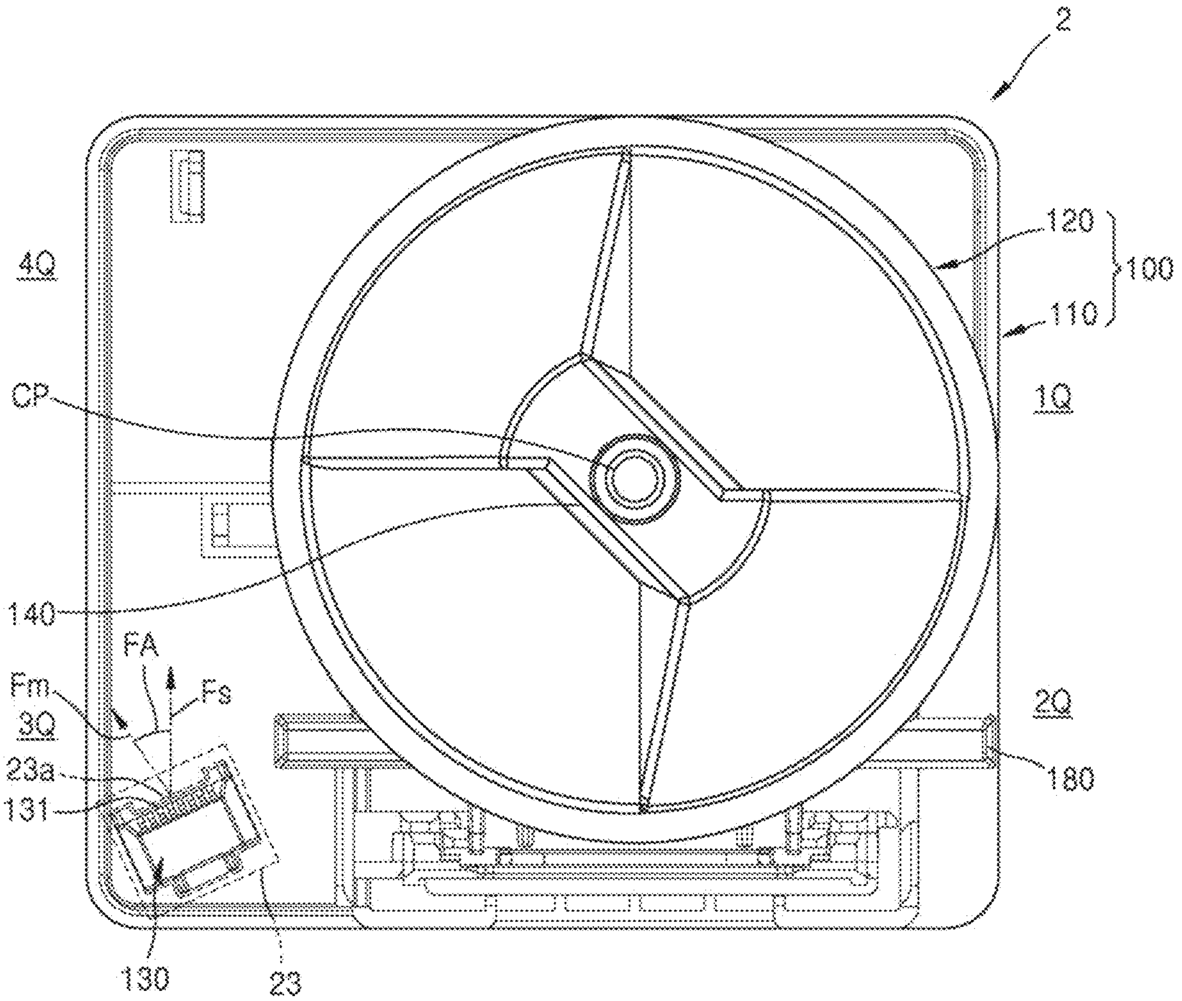
FIG. 4 is a front view of a toner cartridge according to an example.

The electric contact portion 130 may be positioned at the third quadrant 3Q and the fourth quadrant 4Q among quadrants 1Q, 2Q, 3Q, and 4Q in which the center CP of the coupler 140 is set to be the origin. The quadrants 1Q, 2Q, 3Q, and 4Q may be defined at the origin of the center CP of the coupler 140 in a viewpoint of the toner cartridge 2 so that the coupler 140 is rotated clockwise. In an example, the quadrants 1Q, 2Q, 3Q, and 4Q may be defined at the origin of the center CP of the coupler 140 in a front view of the toner cartridge 2 in the removal direction A2. Because the toner outlet 112 is disposed on the body 100, i.e., the bottom surface 113 of the fixing portion 110, the first force Fs of the elastic sealing member 150 may push the body 100, for example, the fixing portion 110, in an upward direction. Based on the electric contact portion 130 being positioned at the third quadrant Q3 and the fourth quadrant Q4, the first force Fs acts in a direction in which the electric contact portion 130 has access to the second electric contact portion 23. Referring to the example of FIG. 1, the electric contact portion 130 is positioned at the fourth quadrant Q4. In this case, it can be known that the first force Fs acts in a direction in which the electric contact portion 130 has access to the second electric contact portion 23. FIG. 4 is a schematic front view of a toner cartridge 2 according to an example. The toner cartridge 2 shown in FIG. 4 is different from the toner cartridge 2 shown in FIG. 1 in that the electric contact portion 130 is positioned at the third quadrant 3Q. As shown in FIG. 4, it can be known that the first force Fs generated by the elastic sealing member 150 acts in a direction in which the electric contact portion 130 has access to the second electric contact portion 23. Thus, based on the electric contact portion 130 being positioned at the third quadrant Q3 and the fourth quadrant Q4, stable electric connection between the electric contact portion 130 and the second electric contact portion 23 may be maintained.

In another aspect, an angle FA between the first force Fs and the second force Fm from the first force Fs based on a rotation direction may be within ±90°. For example, the angle FA may define the rotation direction of the coupler 140 as +direction and an opposite direction to the rotation direction of the coupler 140 as −direction based on the first force Fs in the vertical direction. For example, in FIG. 1, the angle FA may be less than +90°, and in FIG. 4, the angle FA may be less than −90°. These conditions are satisfied based on the electric contact portion 130 being positioned at the third quadrant 3Q and the fourth quadrant 4Q. Based on the electric contact portion 130 being positioned at the first quadrant, the angle FA is greater than +90°, and based on the electric contact portion 130 being positioned at the second quadrant, the angle FA is greater than −90°.

Referring back to FIG. 1, the electric contact portion 130 may be moved in the direction of a resultant force Ft of the first force Fs and the second force Fm. Thus, the contact surface 131 of the electric contact portion 130 may face the direction of the resultant force Ft of the first force Fs and the second force Fm. In other words, the electric contact portion 130 may be disposed so that the normal L2 perpendicular to the contact surface 131 faces the direction of the resultant force Ft. According to such a configuration, stable electrical connection between the electric contact portion 130 and the second electric contact portion 23 may be further maintained.

Referring to FIG. 2, as described above, the handle 170 may be disposed on the body 100, for example, the fixing portion 110. The handle 170 may be used to handle the toner cartridge 2. For example, based on the toner cartridge 2 being mounted/removed on/from the printing apparatus 1, the toner cartridge 2 may be pushed in the mounting direction A1 or pulled in the removal direction A2 while grasping the handle 170. The electric contact portion 130 may be located closer to the handle 170 than the toner outlet 112. According to such a configuration, as the electric contact portion 130 is closer to the handle 170, a force for pushing the toner cartridge 2 in the mounting direction A1 may be stably transferred to the electric contact portion 130, and the position change of the electric contact portion 130 by the force pushing the toner cartridge 2 is small. Thus, the electric contact portion 130 may be stably connected to the second electric contact portion 23.

Figure 5:
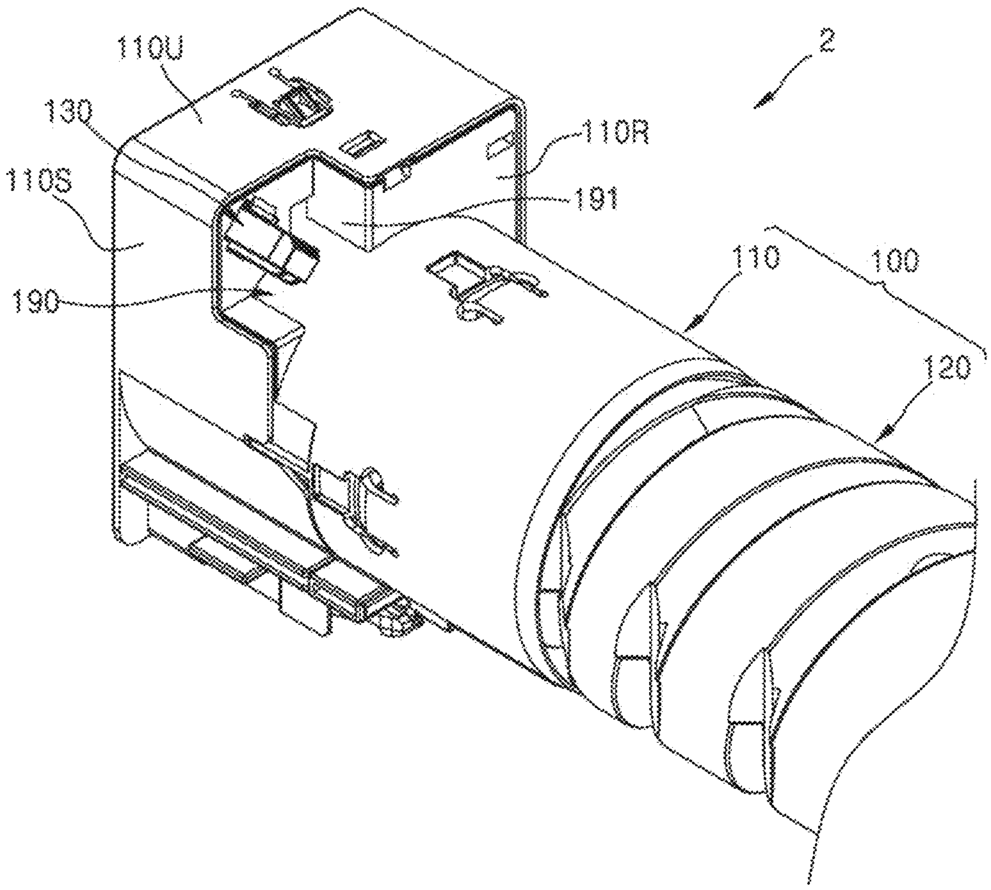
FIG. 5 is a partial perspective view of a toner cartridge according to an example.
Figure 6:
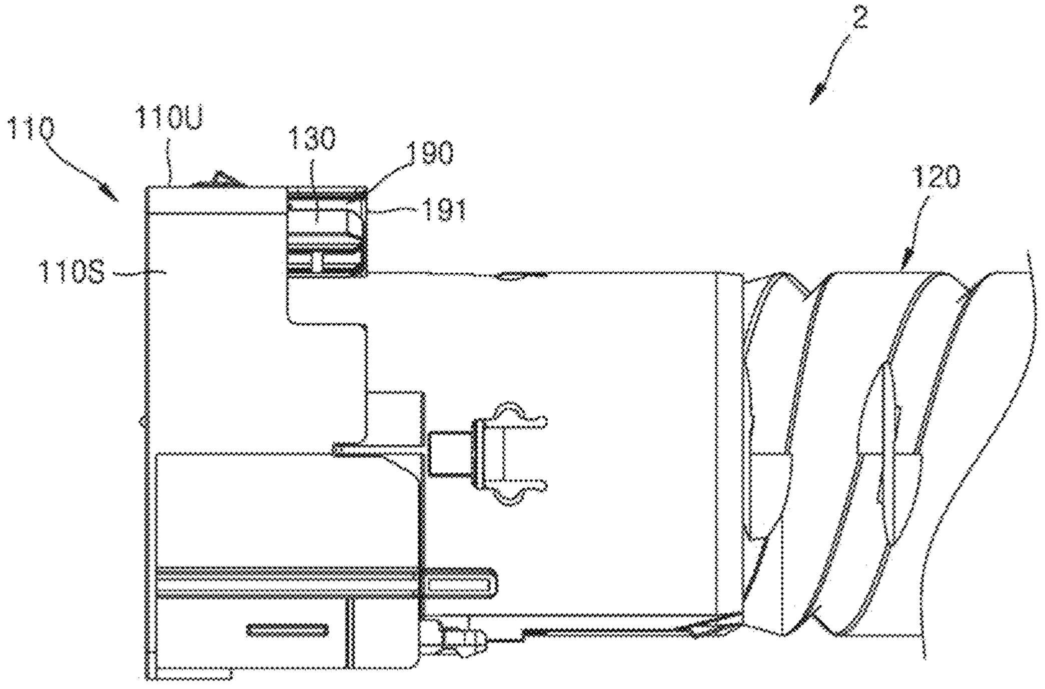
FIG. 6 is a partial cross-sectional view of a toner cartridge according to an example.

FIG. 5 is a partial perspective view of the toner cartridge 2 according to an example. FIG. 6 is a partial cross-sectional view of a toner cartridge 2 according to an example. Referring to FIGS. 5 and 6, a recess 190 may be disposed on the body 100, for example, the fixing portion 110. The recess 190 may be recessed into the body 100, for example, the fixing portion 110 so as to entirely accommodate the electric contact portion 130. The recess 190 may include an opening 191 to provide external access to the electric contact portion 130 in the recess 190 (i.e., from the outside). For example, the recess 190 may be sunken from a top surface 110U, a side surface 110S, and a rear surface 110R of the fixing portion 110. Based on the toner cartridge 2 being mounted on the printing apparatus 1, the opening 191 may be disposed in the mounting direction A1 of the recess 190 so that the electric contact portion 130 may be connected to the second electric contact portion 23 through the opening 191. According to such a configuration, the electric contact portion 130 may not protrude from the top surface 110U, the side surface 110S, or the rear surface 110R. Thus, the risk of applying external shock to the electric contact portion 130 while the toner cartridge 2 is handled, may be reduced, and the risk of damage to the electric contact portion 130 may be reduced.

Figure 7:
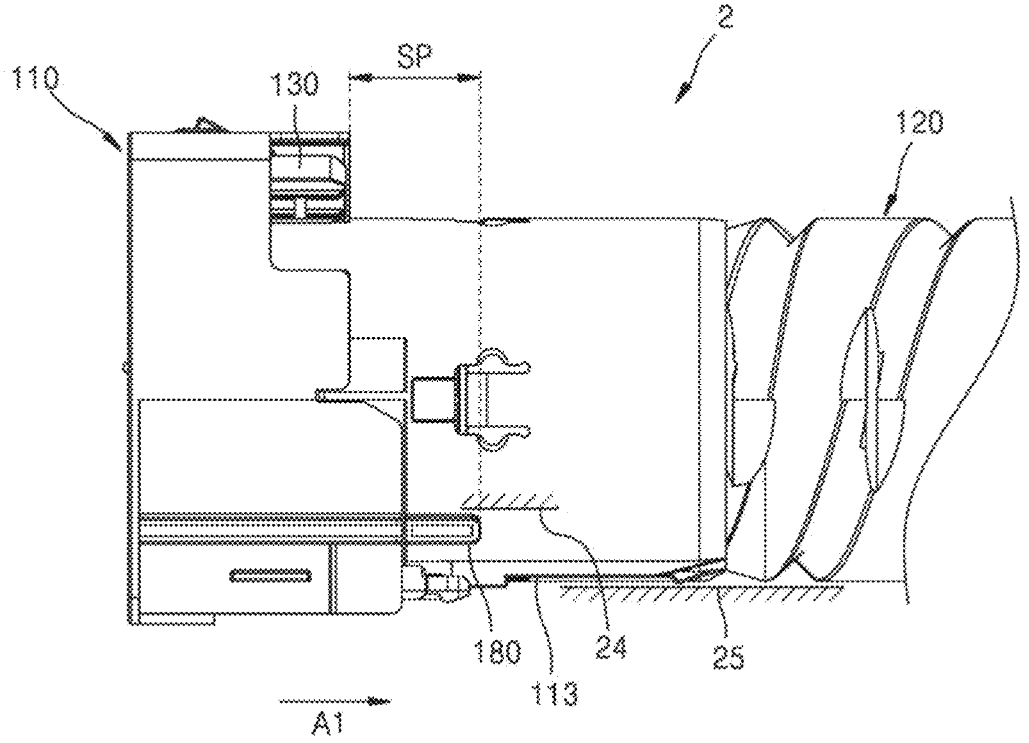
FIG. 7 is a partial cross-sectional view of a toner cartridge according to an example.

FIG. 7 is a partial cross-sectional view of the toner cartridge 2 according to an example. Referring to FIGS. 3 and 7, the toner cartridge 2 includes a positioning portion 180. The positioning portion 180 may establish the position of the toner cartridge 2 in the printing apparatus 1. In an example, the positioning portion 180 may be provided on the body 100, for example, the fixing portion 110. A second positioning portion 24, to which the positioning portion 180 may be guided, may be provided in the printing apparatus 1. The positioning portion 180 may be positioned in front of the electric contact portion 130 based on the mounting direction A1 in which the toner cartridge 2 is mounted on the printing apparatus 1. In an example, the positioning portion 180 may be located in the mounting direction A1 in front of the electric contact portion 130 by a distance SP. Based on the toner cartridge 2 being mounted on the printing apparatus 1, first, the positioning portion 180 may be guided to the second positioning portion 24. Then, the electric contact portion 130 and the second electric contact portion 23 may be aligned in the mounting direction A1. Then, based on the toner cartridge 2 being continuously pushed in the mounting direction A1, the electric contact portion 130 and the second electric contact portion 23 may be stably and electrically in contact with each other while the electric contact portion 130 and the second electric contact portion 23 are aligned in the mounting direction A1. According to such a configuration, the risk of damage to the electric contact portion 130 and the second electric contact portion 23 due to misalignment of the electric contact portion 130 and the second electric contact portion 23 while the toner cartridge 2 is mounted, may be reduced.

Based on the toner cartridge 2 being mounted on the printing apparatus 1, the bottom surface 113 of the fixing portion 110, on which the toner outlet 112 is disposed, may be seated on the second positioning portion 24. The positioning portion 180 may be guided to the second positioning portion 24 after the bottom surface 113 of the fixing portion 110 is seated on the seating portion 25 of the fixing portion

110. In this case, the positioning portion 180 may function as a rotation preventing portion for preventing rotation of the toner cartridge 2.

Figure 8:
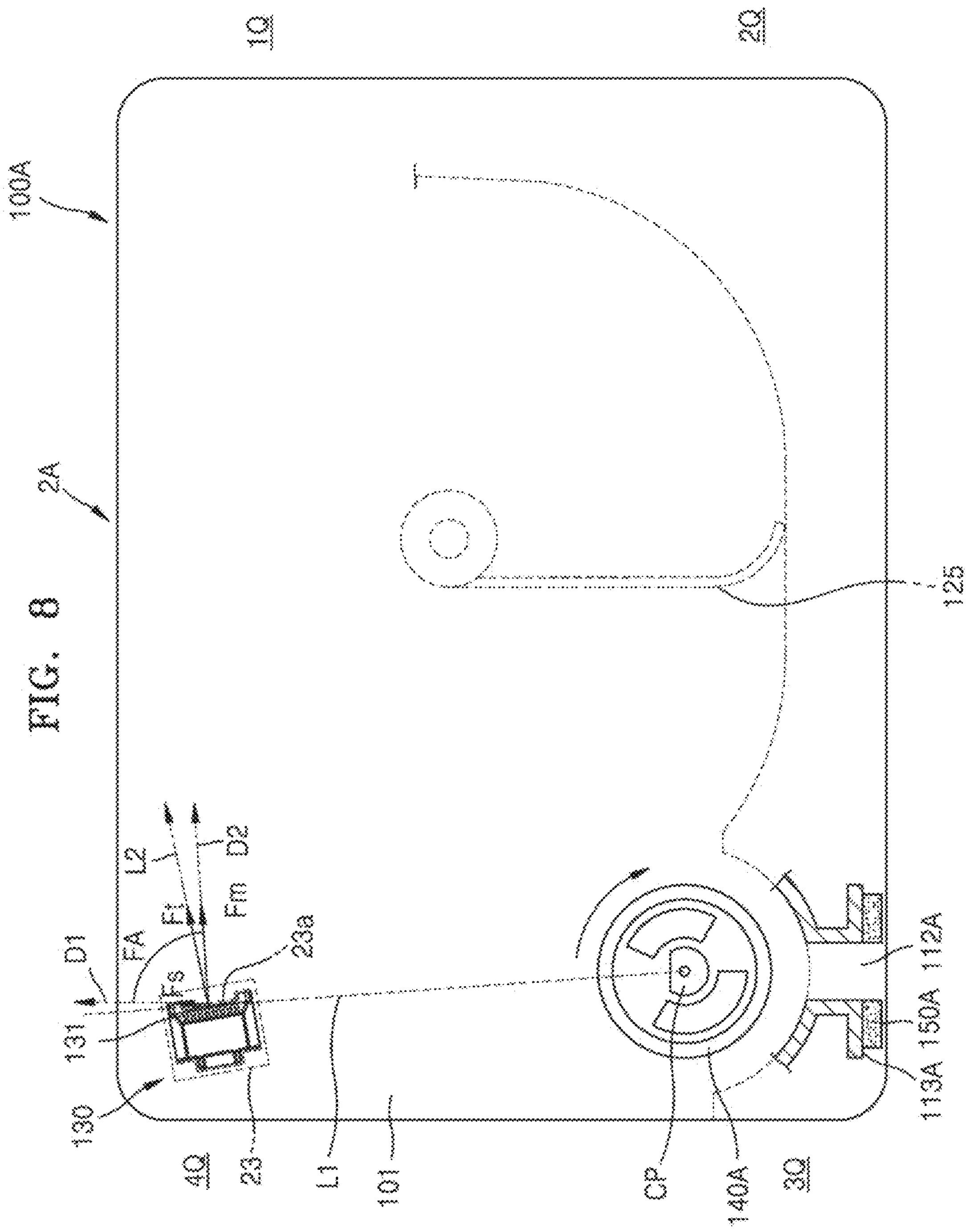
FIG. 8 is a front view of a toner cartridge according to an example.

FIG. 8 is a front view of a toner cartridge 2A according to an example. The toner cartridge 2A of the present example is different from the toner cartridge 2 described with reference to FIGS. 1 through 7 in that the toner cartridge 2A includes an integral body 100A. Hereinafter, differences will be described. Referring to FIG. 8, the toner cartridge 2A may include a body 100A having a toner outlet 112A. In order to illustrate the toner outlet 112A, FIG. 8 is a partial cross-sectional view. Toner may be accommodated in the body 100A. A conveying member 125 to convey toner to the toner outlet 112A may be disposed inside the body 100A. A coupler 140A may be disposed in a rear portion 101 of the body 100A in the mounting direction A2. The conveying member 125 may be connected to the coupler 140A by a power transmission member (not shown), for example, gears. Based on the toner cartridge 2A being mounted on the printing apparatus (1 of FIG. 3), the coupler 140A may be engaged with the driving coupler (22 of FIG. 3). For example, the coupler 140A and the driving coupler 22 may have a complementary shape in which the coupler 140A and the driving coupler 22 may be engaged with each other to transfer a rotation force. The driving motor (21 of FIG. 3) may be driven to rotate the driving coupler 22 so that the coupler 140A and the conveying member 125 may be rotated.

The toner outlet 112A may be disposed on a bottom surface 113A of the body 100A. A seating portion (25 of FIG. 2) having the toner inlet (25*a* of FIG. 2) may be disposed on the printing apparatus 1. Based on the toner cartridge 2A being mounted on the printing apparatus 1, the bottom surface 113A of the body 100A may be mounted on the seating portion 25, and the toner outlet 112A may be aligned with the toner inlet 25*a*. In order to reduce or prevent leakage of toner while the toner is transferred from the toner outlet 112A to the toner inlet 25*a*, an elastic sealing member 150A may be provided. The elastic sealing member 150A may be provided on the bottom surface 113A of the body 100A to surround the toner outlet 112A. In another example, the elastic sealing member 150A may be provided in the seating portion 25 to surround the toner inlet 25*a*. The toner cartridge 2A may include a communication portion, as described above. The communication portion may include a circuit portion (not shown) for monitoring or managing the state of the toner cartridge 2, and an electric contact portion 130 for connecting with the printing apparatus 1.

The example arrangement structure of the electric contact portion 130 described with reference to FIGS. 1 through 7 may be applied to the toner cartridge 2A shown in FIG. 8. A force applied to the electric contact portion 130 by the elastic sealing member 150A is referred to as a first force Fs, and a force acting on the second electric contact portion 130 by rotation of the coupler 140A is referred to as a second force Fm. Due to the first force Fs, the electric contact portion 130 may be moved in a direction of the first force Fs, i.e., in a first direction D1. The first direction D1 may be, for example, vertical. Due to the second force Fm, the electric contact portion 130 may be moved in a direction of the second force Fm, i.e., in a second direction D2. The second direction D2 may be a direction perpendicular to normal L1 for connecting the center CP of the coupler 140A and the electric contact portion 130 may be disposed so that the normal L2 perpendicular to the contact surface 131 faces between the first direction D1 and the second direction D2. The electric contact portion 130 may be disposed in such a way that the contact surface 131 faces between a direction of the first force Fs, i.e., the first direction D1 and a direction of the second force Fm, i.e., the second direction D2. In other words, the electric contact portion 130 may be disposed so that the normal L2 perpendicular to the contact surface 131 faces between the first direction D1 and the second direction D2. According to such a configuration, both of the first force Fs and the second force Fm act in a direction in which the electric contact portion 130 has access to the second electric contact portion 23. That is, based on the electric contact portion 130 being moved in the first direction D1 and the second direction D2, the electric contact portion 130 has access to the second electric contact portion 23. Thus, stable electric connection between the electric contact portion 130 and the second electric contact portion 23 may be maintained.

The electric contact portion 130 may be positioned at the third quadrant 3Q and the fourth quadrant 4Q among quadrants 1Q, 2Q, 3Q, and 4Q in which the center CP of the coupler 140A is set to be the origin. Because the toner outlet 112A is disposed on the bottom surface 113A of body 110A, the first force Fs of the elastic sealing member 150A pushes the body 100 in an upward direction. Based on the electric contact portion 130 being positioned at the third quadrant Q3 and the fourth quadrant Q4, the first force Fs acts in a direction in which the electric contact portion 130 has access to the second electric contact portion 23. Thus, based on the electric contact portion 130 being positioned at the third quadrant Q3 and the fourth quadrant Q4, stable electric connection between the electric contact portion 130 and the second electric contact portion 23 may be maintained. The electric contact portion 130 may be moved in the direction of a resultant force Ft of the first force Fs and the second force Fm. Thus, the contact surface 131 of the electric contact portion 130 may face the direction of the resultant force Ft of the first force Fs and the second force Fm. In other words, the electric contact portion 130 may be disposed so that the normal L2 perpendicular to the contact surface 131 faces the direction of the resultant force Ft. According to such a configuration, stable electrical connection between the electric contact portion 130 and the second electric contact portion 23 may be further maintained.

Figure 9:
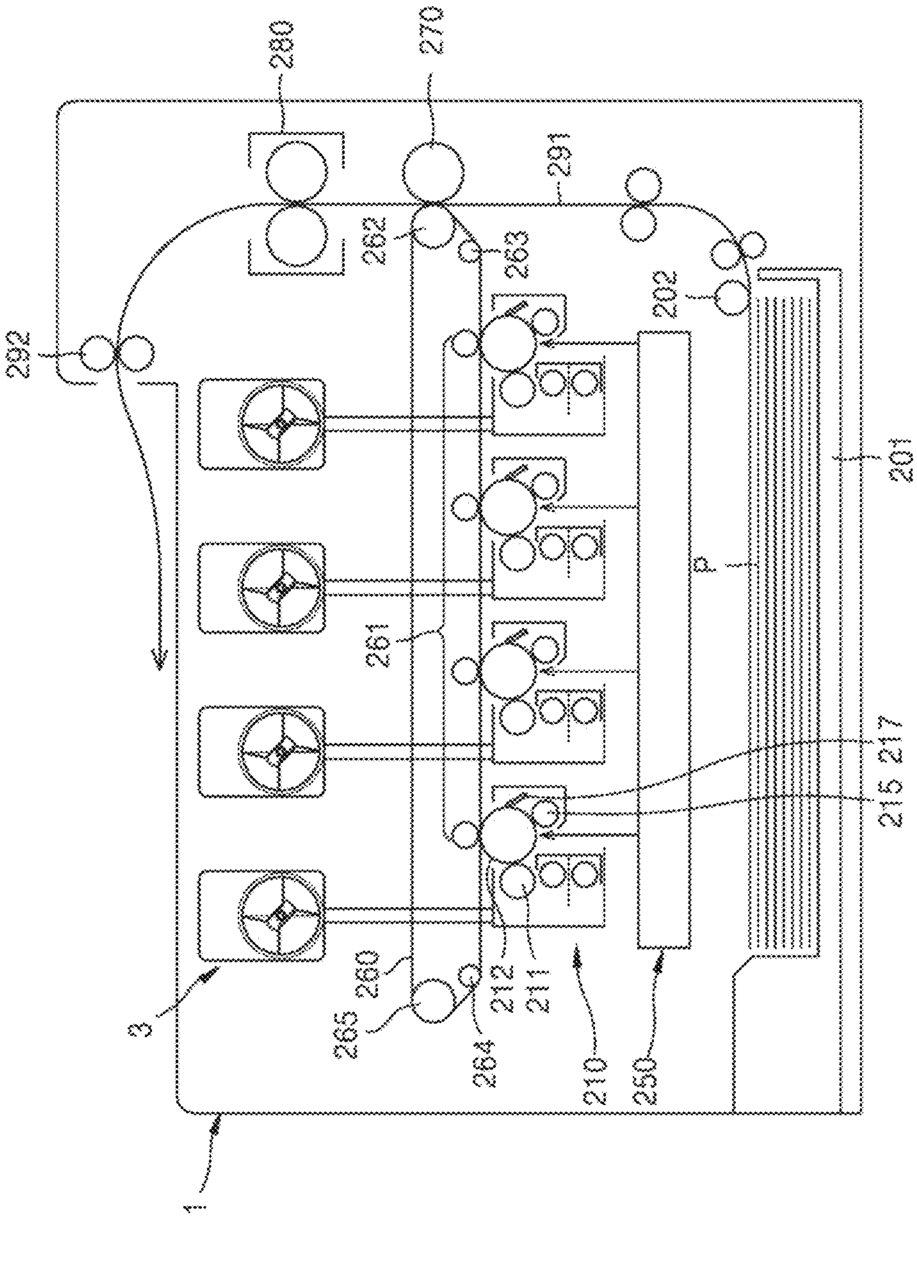
FIG. 9 is a schematic perspective view of a printing apparatus according to an example.

FIG. 9 is a view schematically illustrating the printing apparatus 1 according to an example. Referring to FIG. 9, an example of the printing apparatus 1 includes a developing device 210 to supply the toner to an electrostatic latent image formed on a photoconductor, for example, a photoconductive drum 212 to develop the electrostatic latent image, and a toner cartridge 3 in which the toner to be supplied to the developing device 210 may be accommodated. The printing apparatus 1 may print an image on a printing medium P by using electrophotography. The printing apparatus 1 may print a color image on the printing medium P by using electrophotography.

The printing apparatus 1 may include a plurality of developing devices 210, an exposure unit 250, an intermediate transfer belt 260, a transfer roller 270, and a fusing unit 280. The plurality of developing devices 210 may include four developing devices 210 for forming toner images of yellow (Y), magenta (M), cyan (C), and black (K) colors. Developers of C, M, Y, and K colors, for example, toners, may be accommodated in the four developing devices 210. Toners of Y, M, C, and K colors may be accommodated in four toner cartridges 3, respectively. The toners of Y, M, C, and K may be supplied to four developing devices 210 from the four toner cartridges 3. The developing device 210 may include the photoconductive drum 212 having a surface on which an electrostatic latent image is formed, and a developing roller 211. The developing device 210 may supply toner to the electrostatic latent image to develop the electrostatic latent image in a visible toner image.

A charging roller 215 may charge the photoconductive drum 212 to have a uniform surface electric potential. The exposure unit 250 may irradiate light modulated in correspondence to image information onto the photoconductive drum 212 to form an electrostatic latent image on the photoconductive drum 212. The developing roller 211 may supply the toner accommodated in the developing device 210 to a developing area that faces the photoconductive drum 212. The toner may be supplied to the electrostatic latent image while crossing the developing area by a developing bias voltage applied to the developing roller 211, and the electrostatic latent image may be developed in a visible toner image. The intermediate transfer belt 260 may be supported by a plurality of support rollers 262, 263, 264, and 265 and circulated. Four intermediate transfer rollers 261 may be disposed in a position in which the four intermediate transfer rollers 261 face the photoconductive drums 212 of four developing devices 210 with the intermediate transfer belt 260 therebetween. The toner image developed on the photoconductive drum 212 may be intermediately-transferred to the intermediate transfer belt 260 by an intermediate transfer bias voltage applied to the intermediate transfer roller 261. A cleaning member 217 may remove developer that remains on the surface of the photoconductive drum 212 after an intermediate transfer procedure. The transfer roller 270 may be positioned to face the intermediate transfer belt 260 to form a transfer nip. The printing medium P may be picked up from a feeding cassette 201 by a pickup roller 202 and supplied to the transfer nip along a passage 291. By the transfer bias voltage applied to the transfer roller 270, a toner image on the intermediate transfer belt 260 may be transferred to the printing medium P. The fusing unit 280 may fuse the toner image on the printing medium P by applying heat and pressure to the toner image transferred to the printing medium P. The printing medium P, on which printing has been completed, may be discharged by a discharge roller 292.

As the toner cartridge 3, the toner cartridges 2 and 2A described above may be applied. In an example, the toner cartridge 2 may be applied as the toner cartridge 3. Based on the toner cartridge 3 being mounted on the printing apparatus 1, the electric contact portion 130 may be electrically connected to the second electric contact portion 23 provided in the printing apparatus 1 so that a communication portion of the toner cartridge 3 may communicate with the printing apparatus 1. The toner cartridge 3 may be connected to the developing device 210, and, based on the toner inside the developing device 210 being consumed, a uniform amount of toner may be supplied to the developing device 210. For example, a sensor for detecting the remaining amount of toner may be provided inside the developing device 210. Based on the remaining amount of the toner detected by the sensor being a reference remaining amount or less, a controller (not shown) may drive the toner cartridge 3 so as to supply the toner to the developing device 210. For example, the controller may drive a driving motor (21 of FIG. 1) to rotate the toner storing portion 120. The toner inside the toner storing portion 120 may be transported to the fixing portion 110 by using the spiral structure 122, may be discharged through the toner outlet 112, and supplied to the developing device 210.

Examples described herein should be considered in a descriptive sense and not for purposes of limitation. Descriptions of features or aspects within each example should typically be considered as available for other similar features or aspects in other examples. While examples have been described with reference to the figures, it will be understood that various changes in form and details may be made therein without departing from the spirit and scope as defined by the following claims.

What is claimed is:

1. A toner cartridge comprising:

a fixing portion having a toner outlet formed therein;

a toner storing portion connected to the fixing portion and including a coupler to receive a rotation force, the toner storing portion to transport toner inside the toner storing portion to the fixing portion; and an electric contact portion provided on the fixing portion to electrically connect with a printing apparatus, wherein, based on a force applied to the electric contact portion by an elastic sealing member between the printing apparatus and the toner outlet being referred to as a first force and a force applied to the electric contact portion by rotation of the coupler being referred to as a second force, a contact surface of the electric contact portion faces between a direction of the first force and a direction of the second force.

2. The toner cartridge of claim 1, wherein the toner outlet is provided on a bottom surface of the fixing portion and in a direction toward the toner cartridge so that the coupler is rotated clockwise, and wherein the electric contact portion is located at a third quadrant and a fourth quadrant among quadrants in which a center of the coupler is set to be the origin.

3. The toner cartridge of claim 1, wherein a contact surface of the electric contact portion faces between a direction of the first force and a direction of the second force.

4. The toner cartridge of claim 1, wherein the electric contact portion is disposed so that an angle between the first force and the second force is within ±90 degrees from the first force based on a rotation direction.

5. The toner cartridge of claim 1, wherein the fixing portion comprises a recess to entirely accommodate the electric contact portion and having an opening to provide external access to the electric contact portion in the recess.

6. The toner cartridge of claim 1, further comprising a positioning portion provided in the fixing portion to establish a position of the toner cartridge in the printing apparatus, wherein the positioning portion is placed in front of the electric contact portion based on a mounting direction in which the toner cartridge is mounted on the printing apparatus.

7. The toner cartridge of claim 1, further comprising a handle provided on the fixing portion for handling of the toner cartridge, wherein the electric contact portion is located closer to the handle than the toner outlet.

8. A toner cartridge comprising:

a body having a toner outlet therein;

a coupler provided on the body; and an electric contact portion for electrical connection with a printing apparatus, wherein, based on a force applied to the electric contact portion by an elastic sealing member between the printing apparatus and the toner outlet being referred to as a first force and a force applied to the electric contact portion by rotation of the coupler being referred to as a second force, a contact surface of the electric contact portion faces between a direction of the first force and a direction of the second force.

9. The toner cartridge of claim 8, wherein the toner outlet is provided on a bottom surface of the body and in a direction toward the toner cartridge so that the coupler is rotated clockwise, and wherein the electric contact portion is located at a third quadrant and a fourth quadrant among quadrants in which a center of the coupler is set to be the origin.

10. The toner cartridge of claim 8, wherein a contact surface of the electric contact portion faces a direction of a resultant force of the first force and the second force.

11. The toner cartridge of claim 8, wherein the electric contact portion is disposed so that an angle between the first force and the second force is within ±90 degrees from the first force based on a rotation direction.

12. The toner cartridge of claim 8, wherein the body comprises a recess to entirely accommodate the electric contact portion and having an opening to provide external access to the electric contact portion in the recess.

13. The toner cartridge of claim 8, further comprising a handle provided on the body for handling of the toner cartridge, wherein the electric contact portion is located closer to the handle than the toner outlet.

14. The toner cartridge of claim 8, further comprising a positioning portion provided in the body to establish a position of the toner cartridge in the printing apparatus, wherein the positioning portion is placed in front of the electric contact portion based on a mounting direction in which the toner cartridge is mounted on the printing apparatus.

15. A printing apparatus comprising:

a developing device to supply toner to an electrostatic latent image formed on a photoconductive body to develop the electrostatic latent image;

a second electric contact portion;

a driving coupler; and a detachable toner cartridge to accommodate toner to be supplied to the developing device, wherein the detachable toner cartridge comprises:

a fixing portion having a toner outlet formed therein;

a toner storing portion rotatably connected to the fixing portion and comprising a coupler connected to the driving coupler to receive a rotation force, the toner storing portion to transport toner inside the toner storing portion to the fixing portion;

an elastic sealing member to surround the toner outlet; and an electric contact portion provided in the fixing portion to electrically connect to the second electric contact portion, wherein, based on a force applied to the electric contact portion by the elastic sealing member being referred to as first force and a force applied to the electric contact portion by rotation of the coupler being referred to as a second force, a contact surface of the electric contact portion faces between a direction of the first force and a direction of the second force.

* * * * *